Jan. 30, 1962   E. D. CLICKNER   3,018,979
LEVEL WIND FISHING REEL
Filed May 15, 1959   3 Sheets-Sheet 1
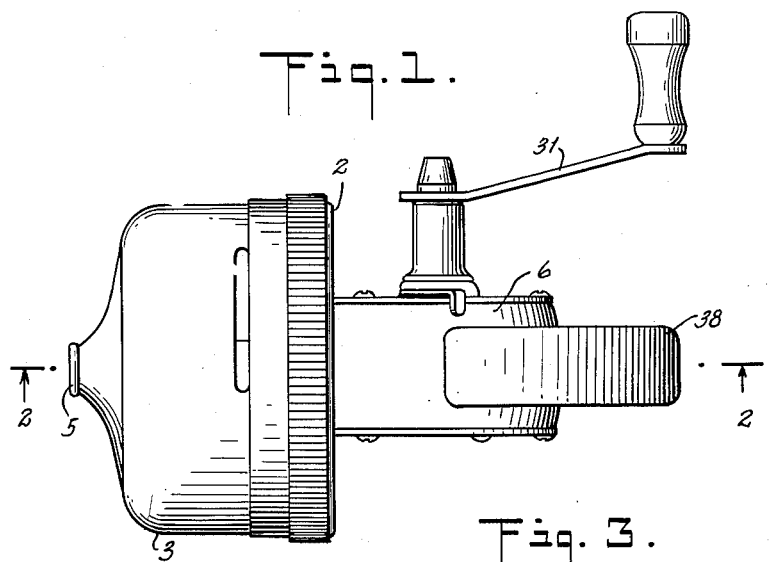
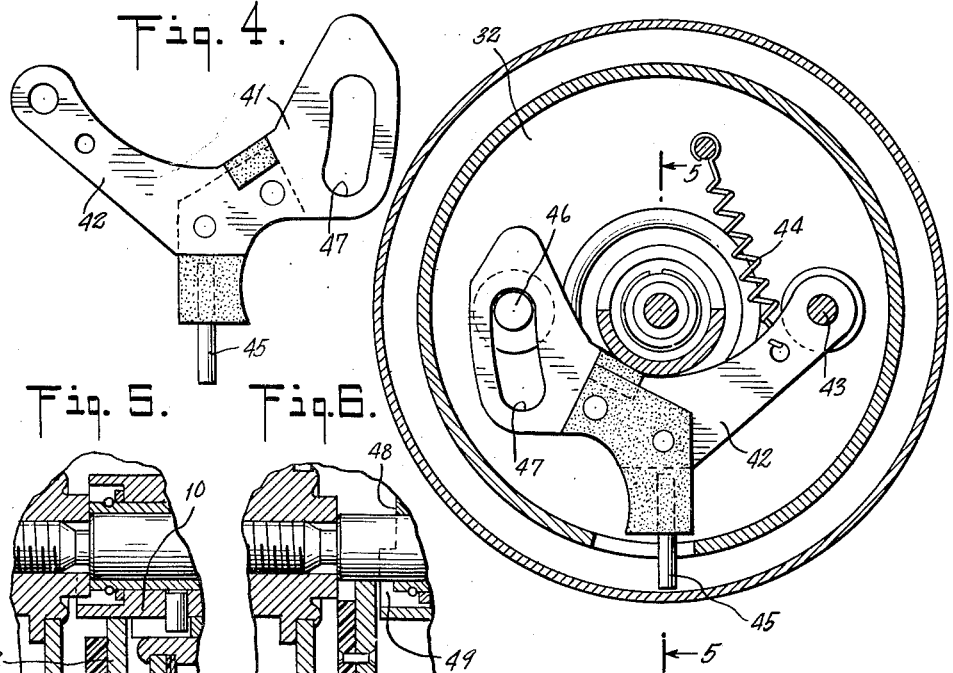
INVENTOR.
EARLE D. CLICKNER
BY
Kenyon & Kenyon
ATTORNEYS

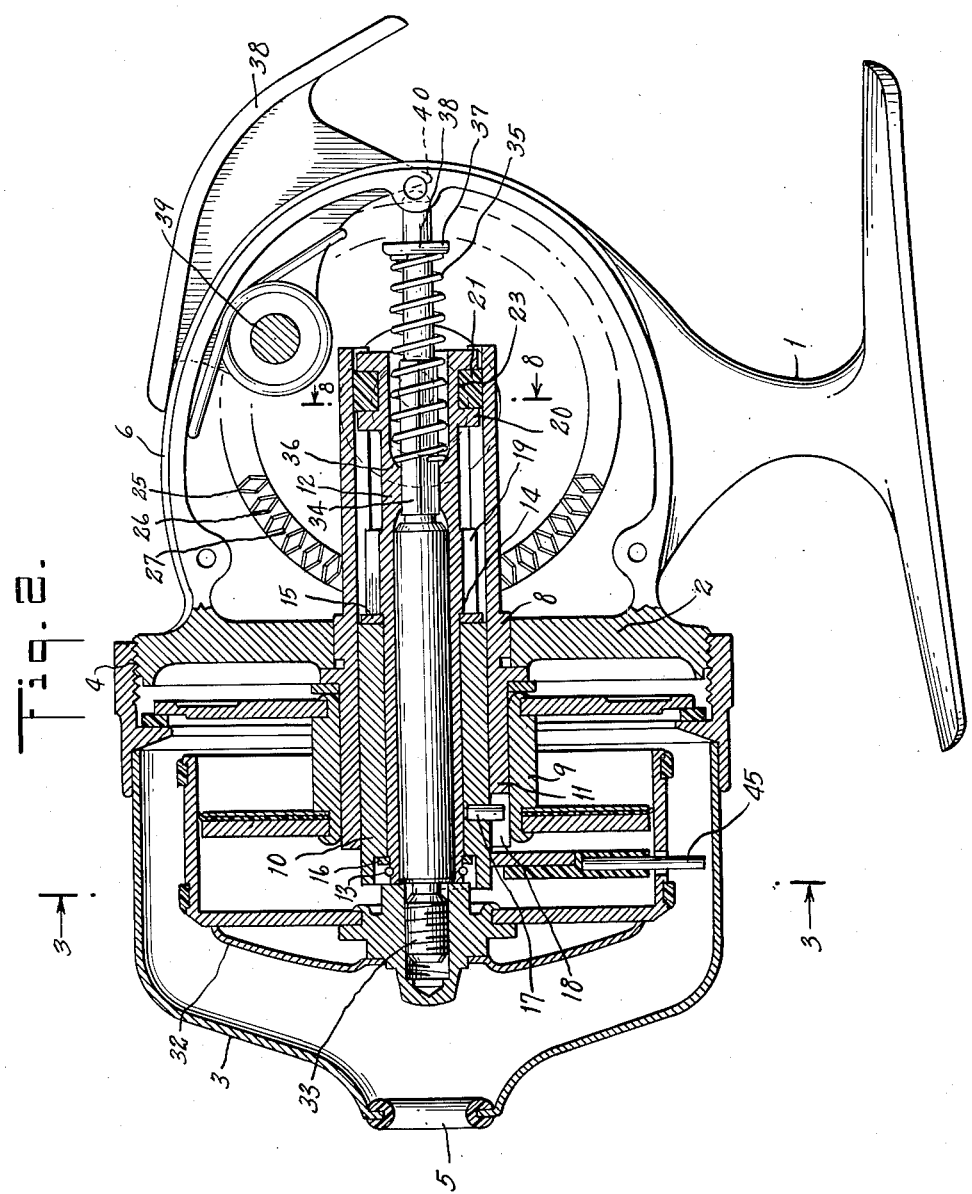

Jan. 30, 1962 E. D. CLICKNER 3,018,979
LEVEL WIND FISHING REEL
Filed May 15, 1959 3 Sheets-Sheet 3

INVENTOR.
EARLE D. CLICKNER
BY
Kenyon & Kenyon
ATTORNEYS

United States Patent Office 3,018,979
Patented Jan. 30, 1962

3,018,979
LEVEL WIND FISHING REEL
Earle D. Clickner, Kalamazoo, Mich., assignor to Shakespeare Company, Kalamazoo, Mich., a corporation of Michigan
Filed May 15, 1959, Ser. No. 813,485
5 Claims. (Cl. 242—84.21)

This invention relates to fishing reels and particularly to fixed spool level wind reels.

Heretofore, such reels have been produced, but generally they have had complicated and costly drives involving a multiplicity of parts. Furthermore, in such reels, where compactness is an important consideration, the provision of adequate bearings for heavy duty and long life has been extremely difficult, if not impossible, without excessively enlarging the reel and making it clumsy and costly.

One of the objects of the invention is to provide a reel of the type described of improved compact construction in which the parts are mounted in adequate bearings for proper rigidity and long life.

Another object is to provide such a reel having an improved, simple, easy operating, long wearing level wind mechanism.

Another object is to provide such a reel in which the parts are simplified and may be easily assembled and disassembled.

Other objects and advantages of the invention will be apparent from the following specification and the drawings which illustrate a preferred form of the invention and in which FIG. 1 is a top plan view of a reel embodying the invention;

FIG. 2 is a detailed sectional view in side elevation taken on the line 2—2 of FIG. 1;

FIG. 3 is a detailed, transverse, sectional view taken on the line 3—3 of FIG. 2.

FIG. 4 is an end view of the line pickup member;

FIG. 5 is a detailed sectional view taken on the line 5—5 of FIG. 3 showing the line pickup member in pick-up position;

FIG. 6 is a sectional view similar to FIG. 5 showing the line pickup member in retracted position.

Figure 7:
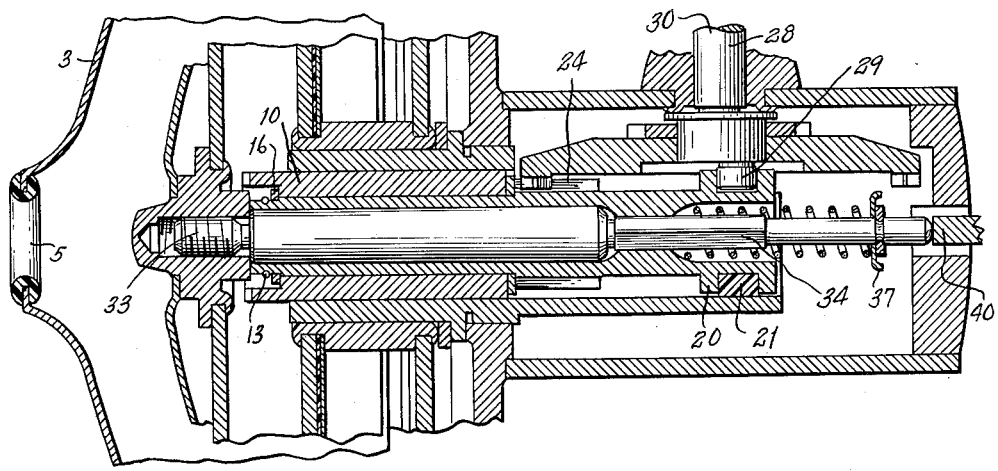
FIG. 7 is a partial top plan sectional view.

In general, the invention involves a fishing reel of the fixed spool type having a central transverse support. A tubular guide bearing member is mounted axially of this support and extends both forwardly and rearwardly therefrom. A fixed spool is mounted concentrically of said tubular bearing forwardly of the support and a slidable unit is mounted in said tubular bearing member. This unit consists of a sleeve which is slidably and nonrotatably disposed in the forward portion of the tubular bearing member and a hollow shaft which is disposed rotatably in the sleeve and extends rearwardly therefrom and is joined thereto against relative axial motion.

A spur gear is fixed concentrically on the hollow shaft rearwardly of the sleeve and a pair of disks are fixed to the shaft rearwardly of the gear to form a circumferential groove. The tubular guide bearing member is laterally slotted to expose the disks and the spur gear for engagement with a crown gear and crank for rotating and reciprocating the hollow shaft.

The crown gear is one which is provided with a plurality of peripherally disposed teeth, each of which is generally diamond shape in plan as viewed from the face of the gear. One diagonal of the diamond extends substantially radially of the gear and the other extends generally circumferentially of the gear, so that the vertices at the ends of the circumferentially extending diagonals lie in a common circle concentric with the axis of said gear to form line contact tooth faces and clearance is provided at both sides of said common circle.

The crank consists of a pin projecting from the plane of the face of the gear eccentrically of its axis of rotation. This pin engages between the spaced disks so that rotation of the gear and crank will both rotate the hollow shaft and reciprocate it.

A slidable, nonrotatable shaft is disposed in the hollow shaft, and a spooling member is fixed at the forward end of the slidable shaft. Spring means are provided for normally urging the slidable shaft rearwardly, and means are provided for sliding this shaft forwardly.

The spooling member is provided with line pickup means and means for retracting the line pickup means when the slidable shaft is moved forwardly. There are also means on the sleeve for engaging the line pickup means and moving it outwardly to line pickup position when the slidable shaft is moved rearwardly and the hollow shaft is rotated.

With this arrangement a minimum number of parts, each relatively simple, is used and the parts are provided with adequate bearings.

The reel shown in the drawings consists of a suitable base 1 and a transverse central support 2, a housing 3 screw-threaded at 4 to the support 2 and provided with a central line opening 5. Gear housing 6 is provided for housing the driving gears and related mechanism.

A tubular guide bearing member 8 is supported axially of the central transverse support 2. It extends therethrough and projects both forwardly and rearwardly from the support.

A fixed spool 9 is disposed concentrically of the tubular guide bearing member and a unitary member is mounted in said tubular guide bearing member. This unitary member consists of a sleeve 10 which is slidably and nonrotatably disposed in the forward portion 11 of the tubular bearing member and a hollow shaft 12 which is disposed rotatably in the sleeve and extends rearwardly therefrom.

The sleeve 10 and the shaft 12 are joined against relative axial motion by the snap ring 13, so that the sleeve 10 and the hollow shaft 12 may be moved axially as a unit.

The shaft 12 is shouldered as indicated at 14, and washers 15 and 16 are employed to reduce friction.

A pin 17 fixed in the sleeve 10 and fitting into slot 18 in the tubular guide bearing member 8 prevents rotation of the sleeve 10 while permitting backward and forward sliding movement thereof.

A spur gear 19 is fixed concentrically on the hollow shaft 12 rearwardly of the sleeve 10 for rotating the hollow shaft. Rearwardly of said spur gear are a pair of spaced disks 20 having a nylon bearing member 21 which fits slidably in the bore of the tubular guide bearing member 8 fitted in a groove 23 between said disks, which groove also receives a crankpin which is described hereafter.

The tubular guide bearing member 8 is laterally slotted, as indicated at 24, to expose the spur gear 19 and the disks 20 and groove 23 for driving purposes.

A crown gear 25 is provided for rotating the hollow shaft 12. It is made in accordance with and incorporates the inventions of my copending application Serial No. 699,241, filed November 27, 1957, now Patent No. 2,974,534, for Fishing Reel and Gearing.

This crown gear has a plurality of peripherally disposed teeth 26. Each of said teeth is generally diamond shaped in plan as viewed from the face of the gear and each has one diagonal extending substantially radially of the gear and the other diagonal extending generally circumferentially of the gear. The vertices at the ends of the circumferentially extending diagonals lie in a common circle indicated at 27, which is concentric with the axis of the gear which is indicated at 28. Said vertices form line contact tooth faces and the retreating sides which extend to the ends of the other or radial diagonal provide clearance at both sides of the circle.

The teeth 26 of the gear 25 engage the teeth of the spur gear 19, and even during the driving thereof it is possible to reciprocate the spur gear 19 and its shaft for the purpose of level winding the line.

Figure 8:
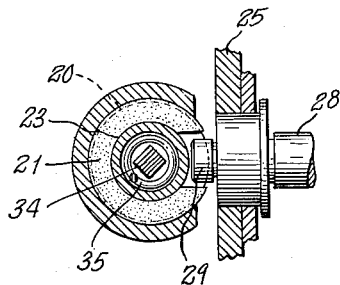
FIG. 8 is a detailed sectional view taken on line 8—8 of FIG. 2.

The hollow shaft 12 is reciprocated by means of a crank pin 29 which fits in the groove 23 between the disks 20 and is mounted eccentrically of the axis 28 of the gear 25, as is best seen in FIGS. 7 and 8. Rotation of the gear 25 about its axis by means of shaft 30 which is provided with a crank 31 causes rotation and reciprocation of the shaft 12 and also the reciprocation and rotation of the spooling member 32 which is fixed on the forward end of a slidable but nonrotatable shaft 33 which extends through the hollow shaft 12. The squaring 34 of the shaft 33 indicated in FIGS. 2 and 7 prevents relative rotation between shaft 33 and shaft 12.

Means are provided for normally forcing the shaft 33 rearwardly. These include a compression spring 35 bearing against shoulder 36 on shaft 12 and shoulder 37 formed by a disk 38 mounted on shaft 33.

Means for moving shaft 33 forwardly comprise a lever 38 pivoted at 39 and having a bearing portion 40 bearing against the rear end of the shaft 33. Pressure on the lever 38 moves the shaft forwardly, so that the forward end of the spooling member 32 may be pressed into engagement with the housing 3 to grip the line to hold it for casting purposes.

The spooling member 32 rotates with the shaft 12 and is provided with line pickup means 41 which comprise a lever 42 pivoted at 43 on the spooling member 32 and normally urged by tension spring 44 in a clockwise direction around pivot 43 as viewed in FIG. 3. The lever 42 carries a line pickup pin 45 and is provided with guiding means comprising a pin 46 and slot 47.

When the shaft 33 is moved forwardly by means of the lever 38 the spring 44 moves the line pickup means to retracted position indicated in FIG. 6. The pin 45 is retained within the spooling member 32 so that the line can peel off the spool 9.

As pointed out above, the line is gripped between the spooling member and the casing to be released at the proper time in making the cast by release of the lever 38.

After a cast has been completed and it is wished to retrieve the line, pin 45 is moved to extended position shown in FIG. 5 by means of a cam mechanism on the end of sleeve 10. The cam is formed by cutting away a portion of the end of the sleeve 10 as indicated at 48 in FIG. 6, leaving a protruding or cam portion 49 which engages the lever 42 when the spooling member 32 is moved rearwardly by rearward motion of the shaft 33. When the spooling member 32 is rotated, the lever 42, if it has not already done so, drops into the portion 48, so that on further rotation of the spooling member 32 the portion 49 urges the lever 42 in a counterclockwise position, as viewed in FIG. 3. Thereafter the lever slips farther back so that it engages the periphery of sleeve 10, as indicated in FIG. 5. This keeps the spooling member in line pickup position during rotation of the spooling member, and it remains in this projected position until forward movement of the shaft 33 by manipulation of the lever 38.

In operation, the lever 38 is depressed, carrying the spooling member 32 forward to line holding position. This permits the line pickup pin 45 to retract so that a cast can be made by manipulation of the rod and release of the lever 38 at the proper time in the cast. The release of the lever 38 drops the spooling member back to the position shown in FIG. 6 and rotation of the shaft 12 and with it the spooling member 32 causes the pin 45 to be moved to pickup position shown in FIG. 5 as described above. Continued rotation of the shaft 12 by means of the crank 31 causes the spooling member to rotate, and the crank mechanism comprising the pin 29 and the disks 20 causes reciprocation of the spooling member 32 resulting in level winding of the line on the spool with the turns of line crossing the turns already on the spool.

By employing the special gearing described above, it is possible to secure level winding with a very inexpensive construction. Bevel gearing is eliminated and with it the necessity for careful positioning of gear centers.

By employing the particular bearing arrangement the parts are all firmly supported and guided, providing for smooth operation and long life of the reel.

It has been found that when the particular arrangement of slidable shaft and retracting spring is employed, adequate spooling and level wind action is achieved, even though considerable force is exerted on the line by a fish. No means other than the spring 35 are needed to hold the spooling member back in position to achieve the desired level wind winding action. The pull on the line will not pull the spooling member forwardly during reeling in.

The present invention may be embodied in other specific forms without departing from the spirit or essential attributes thereof. It is therefore desired that the present embodiments be considered in all respects as illustrative and not restrictive, reference being had to the appended claims rather than to the foregoing description to indicate the scope of the invention.

I claim:

1. In a fishing reel of the type having a central transverse support, a fixed spool disposed forwardly thereof on a longitudinally extending axis, a spooling member disposed coaxially with and around said spool and rotatable about and reciprocable along said axis and having line pickup means and means for retracting said line pickup means on forward movement of said spooling means and means for moving said line pickup means outwardly upon rearward movement of said spooling means, the improvement comprising means for supporting, rotating and reciprocating said spooling means both for actuating said pickup means and for effecting level winding of a line on said spool comprising a tubular guide bearing member disposed along said axis through and both forwardly and rearwardly of said transverse support and within said fixed spool, and a unit slidable in said tubular bearing member comprising a sleeve slidably and nonrotatably disposed in the forward portion of said tubular bearing member and a hollow shaft disposed rotatably in said sleeve and extending rearwardly therefrom and means for joining said sleeve and hollow shaft against relative axial motion, a spur gear fixed concentrically on said hollow shaft rearwardly of said sleeve, said tubular guide bearing member being laterally slotted to expose said spur gear, means for rotating said hollow shaft comprising a crown gear mounted on a shaft perpendicular to said hollow shaft and having a plurality of peripherally disposed teeth extending laterally from the face of said crown gear for engagement with the teeth of said spur gear, each of said teeth of said crown gear being generally diamond shaped in plan as viewed from the face of the gear and having one diagonal extending substantially radially of said gear and having the other diagonal extending generally circumferentially of said gear with the vertices at the ends of said circumferentially extending diagonals lying in a common circle concentric with the axis of said crown gear, each tooth having a pair of contact faces, one on each side of said tooth, each comprising a line extending substantially perpendicular to the face of said crown gear and disposed at said common circle and comprising the line of meeting of a pair of surfaces of said tooth, said surfaces extending from said contact face back toward the radially extending diagonals of said tooth and thereby providing clearances at both sides of said circle for the teeth of said spur gear, said contact faces contacting the teeth of said spur gear for driving engagement therewith and permitting sliding movement of said spur gear along the axis of the reel, whereby rotation of said crown gear will rotate said hollow shaft through engagement of the contact faces only of the teeth of said crown gear with the teeth of said spur gear and means to simultaneously reciprocate said hollow shaft, a slidable mounting shaft slidably but non-rotatably disposed in said hollow shaft and fixed at its forward end to said spooling member to support the same for rotation by said slidable shaft when it is rotated by rotation of said hollow shaft and compression spring means engaging said slidable mounting shaft and said hollow shaft normally urging said slidable mounting shaft rearwardly and means for engaging the rear end of said slidable mounting shaft for moving it forwardly of said sleeve and hollow shaft providing forward movement of said spooling means, said means for moving said line pickup means outwardly being supported on said sleeve.

2. In a fishing reel of the type having a central transverse support, a fixed spool disposed forwardly thereof on a longitudinally extending axis, a spooling member disposed coaxially with and around said spool and rotatable about and reciprocable along said axis and having line pickup means and means for retracting said line pickup means on forward movement of said spooling means and means for moving said line pickup means outwardly upon rearward movement of said spooling means, the improvement comprising means for supporting, rotating and reciprocating said spooling means both for actuating said pickup means and for effecting level winding of a line on said spool comprising a tubular guide bearing member disposed along said axis through and both forwardly and rearwardly of said transverse support and within said fixed spool, and a unit slidable in said tubular bearing member comprising a sleeve slidably and non-rotatably disposed in the forward portion of said tubular bearing member and a hollow shaft disposed rotatably in said sleeve and extending rearwardly therefrom and means for joining said sleeve and hollow shaft against relative axial motion, a spur gear fixed concentrically on said hollow shaft rearwardly of said sleeve and a pair of spaced disks fixed concentrically on said hollow shaft rearwardly of said spur gear to form a circumferential groove, a guide bearing for the rear end of said hollow shaft slidable in said tubular guide bearing and disposed in said groove, said tubular guide bearing member being laterally slotted to expose said disks and spur gear, means for rotating and reciprocating said hollow shaft comprising a crown gear mounted on a shaft perpendicular to said hollow shaft and having a plurality of peripherally disposed teeth extending laterally from the face of said crown gear for engagement with the teeth of said spur gear, each of said teeth of said crown gear being generally diamond shaped in plan as viewed from the face of the gear and having one diagonal extending substantially radially of said gear and having the other diagonal extending generally circumferentially of said gear with the vertices at the ends of said circumferentially extending diagonals lying in a common circle concentric with the axis of said crown gear, each tooth having a pair of contact faces, one on each side of said tooth, each comprising a line extending substantially perpendicular to the face of said crown gear and disposed at said common circle and comprising the line of meeting of a pair of surfaces of said tooth, said surfaces extending from said contact face back toward the radially extending diagonals of said tooth and thereby providing clearances at both sides of said circle for the teeth of said spur gear, said contact faces contacting the teeth of said spur gear for driving engagement therewith and permitting sliding movement of said spur gear along the axis of the reel, a crank pin mounted eccentrically of the axis of rotation of said crown gear and engaging between said spaced disks, whereby rotation of said crown gear and crank pin will rotate said hollow shaft through engagement of the contact faces only of the teeth of said crown gear with the teeth of said spur gear and will simultaneously reciprocate said hollow shaft through the engagement of said crank pin with said disks, a slidable mounting shaft slidably but non-rotatably disposed in said hollow shaft and fixed at its forward end to said spooling member to support the same for rotation by said slidable shaft when it is rotated by rotation of said hollow shaft, and means for engaging the rear end of said slidable mounting shaft for moving it forwardly of said sleeve and hollow shaft for providing forward movement of said spooling means, said means for moving said line pickup means outwardly being supported on said sleeve.

3. In a fishing reel of the type having a central transverse support, a fixed spool disposed forwardly thereof on a longitudinally extending axis, a spooling member disposed coaxially with and around said spool and rotatable about and reciprocable along said axis and having line pickup means and means for retracting said line pickup means on forward movement of said spooling means and means for moving said line pickup means outwardly upon rearward movement of said spooling means, the improvement comprising means for supporting, rotating and reciprocating said spooling means both for actuating said pickup means and for effecting level winding of a line on said spool comprising a tubular guide bearing member disposed along said axis through and both forwardly and rearwardly of said transverse support and within said fixed spool, and a unit slidable in said tubular bearing member comprising a sleeve slidably and non-rotatably disposed in the forward portion of said tubular bearing member and a hollow shaft disposed rotatably in said sleeve and extending rearwardly therefrom and means for joining said sleeve and hollow shaft against relative axial motion, a spur gear fixed concentrically on said hollow shaft rearwardly of said sleeve, said tubular guide bearing member being laterally slotted to expose said spur gear, means for rotating said hollow shaft comprising a crown gear mounted on a shaft perpendicular to said hollow shaft and having a plurality of peripherally disposed teeth extending laterally from the face of said crown gear for engagement with the teeth of said spur gear, each of said teeth of said crown gear being generally diamond shaped in plan as viewed from the face of the gear and having one diagonal extending substantially radially of said gear and having the other diagonal extending generally circumferentially of said gear with the vertices at the ends of said circumferentially extending diagonals lying in a common circle concentric with the axis of said crown gear, each tooth having a pair of contact faces, one on each side of said tooth, each comprising a line extending substantially perpendicular to the face of said crown gear and disposed at said common circle and comprising the line of meeting of a pair of surfaces of said tooth, said surfaces extending from said contact face back toward the radially extending diagonals of said tooth and thereby providing clearances at both sides of said circle for the teeth of said spur gear, said contact faces contacting the teeth of said spur gear for driving engagement therewith and permitting sliding movement of said spur gear along the axis of the reel, whereby rotation of said crown gear will rotate said hollow shaft through engagement of the contact faces only of the teeth of said crown gear with the teeth of said spur gear and means to simultaneously reciprocate said hollow shaft, a slidable mounting shaft slidably but non-rotatably disposed in said hollow shaft and fixed at its forward end to said spooling member to support the same for rotation by said slidable shaft when it is rotated by rotation of said hollow shaft, and means for engaging the rear end of said slidable mounting shaft for moving it forwardly of said sleeve and hollow shaft for providing forward movement of said spooling means, said means for moving said line pickup means outwardly being supported on said sleeve.

4. In a fishing reel of the type having a central transverse support, a fixed spool disposed forwardly thereof on a longitudinally extending axis, a spooling member disposed coaxially with and around said spool and rotatable about and reciprocable along said axis and having line pickup means and means for retracting said line pickup means on forward movement of said spooling means and means for moving said line pickup means outwardly upon rearward movement of said spooling means, the improvement comprising means for supporting, rotating and reciprocating said spooling means both for actuating said pickup means and for effecting level winding of a line on said spool comprising a tubular guide bearing member disposed along said axis through and both forwardly and rearwardly of said transverse support and within said fixed spool, and a unit slidable in said tubular bearing member comprising a sleeve slidably and non-rotatably disposed in the forward portion of said tubular bearing member and a hollow shaft disposed rotatably in said sleeve and extending rearwardly therefrom and means for joining said sleeve and hollow shaft against relative axial motion, a guide bearing for the rear end of said hollow shaft slidable in said tubular guide bearing, means for rotating and reciprocating said hollow shaft, a slidable mounting shaft slidably but non-rotatably disposed in said hollow shaft and fixed at its forward end to said spooling member to support the same for rotation by said slidable shaft when it is rotated by rotation of said hollow shaft, and means for engaging the rear end of said slidable shaft for moving it forwardly of said sleeve and hollow shaft for providing forward movement of said spooling means, said means for moving said line pickup means outwardly being supported on said sleeve, and compression spring means engaging said slidable mounting shaft and said hollow shaft normally urging said slidable mounting shaft rearwardly.

5. In a fishing reel of the type having a central transverse support, a fixed spool disposed forwardly thereof on a longitudinally extending axis, a spooling member disposed coaxially with and around said spool and rotatable about and reciprocable along said axis and having line pickup means and means for retracting said line pickup means on forward movement of said spooling means and means for moving said line pickup means outwardly upon rearward movement of said spooling means, the improvement comprising means for supporting, rotating and reciprocating said spooling means both for actuating said pickup means and for effecting level winding of a line on said spool comprising a tubular guide bearing member disposed along said axis through and both forwardly and rearwardly of said transverse support and within said fixed spool, and a unit slidable in said tubular bearing member comprising a sleeve slidably and non-rotatably disposed in the forward portion of said tubular bearing member and a hollow shaft disposed rotatably in said sleeve and extending rearwardly therefrom and means for joining said sleeve and hollow shaft against relative axial motion, a guide bearing for the rear end of said hollow shaft slidable in said tubular guide bearing, means for rotating and reciprocating said hollow shaft, a slidable mounting shaft slidably but non-rotatably disposed in said hollow shaft and fixed at its forward end to said spooling member to support the same for rotation by said slidable shaft when it is rotated, and means for engaging the rear end of said slidable shaft for moving it forwardly in said sleeve and hollow shaft for providing forward movement of said spooling means, said means for moving said line pickup means outwardly being supported on said sleeve.

References Cited in the file of this patent

UNITED STATES PATENTS

| | | |
|---|---|---|
| 2,667,312 | Denison et al. | Jan. 26, 1954 |
| 2,724,563 | Shakespeare et al. | Nov. 22, 1955 |
| 2,750,850 | Wildhaber | June 19, 1956 |
| 2,828,088 | Denison et al. | Mar. 25, 1958 |
| 2,852,205 | Beger | Sept. 16, 1958 |
| 2,904,281 | Jackson | Sept. 15, 1959 |

FOREIGN PATENTS

| | | |
|---|---|---|
| 602,922 | Great Britain | June 4, 1948 |